(12) United States Patent
Va et al.

(10) Patent No.: US 11,041,934 B2
(45) Date of Patent: *Jun. 22, 2021

(54) PRECISE POSITIONING USING MILLIMETER WAVE NARROW BEAMFORMING

(71) Applicant: TOYOTA JIDOSHA KABUSHIKI KAISHA, Toyota (JP)

(72) Inventors: Vutha Va, Mountain View, CA (US); Takayuki Shimizu, Mountain View, CA (US); Gaurav Bansal, Mountain View, CA (US); Toru Nakanishi, Toyota (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/154,175

(22) Filed: Oct. 8, 2018

(65) Prior Publication Data

US 2019/0041489 A1 Feb. 7, 2019

Related U.S. Application Data

(63) Continuation of application No. 15/099,436, filed on Apr. 14, 2016, now Pat. No. 10,107,889.

(51) Int. Cl.
*G01S 5/02* (2010.01)
*G01S 1/04* (2006.01)
*G01S 1/68* (2006.01)

(52) U.S. Cl.
CPC ............ *G01S 5/0252* (2013.01); *G01S 1/042* (2013.01); *G01S 1/68* (2013.01); *G01S 5/02* (2013.01); *G01S 5/0226* (2013.01)

(58) Field of Classification Search
CPC . G01S 1/042; G01S 1/045; G01S 1/68; G01S 5/02; G01S 5/0221; G01S 5/0226; G01S 5/0252

(Continued)

(56) References Cited

U.S. PATENT DOCUMENTS 6,781,968 B1  8/2004  Colella et al.
7,336,226 B2  2/2008  Jung et al.
(Continued)

FOREIGN PATENT DOCUMENTS

JP  PO2001-147121  5/2001
JP  2002-077037   3/2002
JP  PO2012-147102  8/2012

OTHER PUBLICATIONS

Lou Frenzel, "Millimeter Waves Will Expand the Wireless Future," downloaded from http://bit.ly/1G0zXAM on Apr. 21, 2016, pp. 1-14.

(Continued)

*Primary Examiner* — Dao L Phan
(74) *Attorney, Agent, or Firm* — Burbage Law, P.C.; Elizabeth Ruzich; Jon-Michael Burbage

(57) ABSTRACT

The disclosure includes implementations for determining a position of a vehicle using millimeter wave narrow beamforming. A method may include receiving a set of training packets that each uniquely identify a position on a portion of a roadway where the vehicle is located. Each of the training packets included in the set may be associated with only one of the millimeter wave narrow beams. The method may include identifying a training packet included in the set of training packets that has a highest receive power level among the set of training packets. The method may include determining the position uniquely identified by the training packet having the highest receive power level. The method may include determining positional information for the vehicle based on the position uniquely identified by the training packet having the highest receive power level. The positional information may describe a location of the vehicle on the roadway.

20 Claims, 7 Drawing Sheets

(58) Field of Classification Search
USPC .......................................................... 342/457
See application file for complete search history.

(56) References Cited

U.S. PATENT DOCUMENTS

| | | | |
|---|---|---|---|
| 7,782,251 | B2 | 8/2010 | Bishop et al. |
| 8,362,946 | B2 | 1/2013 | Bishop et al. |
| 8,457,026 | B1 | 6/2013 | Ho et al. |
| 8,611,288 | B1 | 12/2013 | Zhang et al. |
| 10,107,889 | B2 * | 10/2018 | Va .......................... G01S 5/0252 |
| 2007/0001895 | A1 | 1/2007 | Kolinko et al. |
| 2017/0142540 | A1 | 5/2017 | Shirakata et al. |

OTHER PUBLICATIONS

Toshiki Yamawaki et al, "60-GHz Millimeter-Wave Automotive Radar," Fujitsu TEN Tech. J., No. 11, 1998, pp. 1-14.
Martin Schneider, "Automotive Radar—Status and Trends," GeMic, downloaded from http://bit.ly/1WuDbIN on Apr. 15, 2016, pp. 144-147.

\* cited by examiner

PRECISE POSITIONING USING MILLIMETER WAVE NARROW BEAMFORMING

CROSS-REFERENCE TO RELATED APPLICATIONS

This patent application is a continuation of U.S. patent application Ser. No. 15/099,436, entitled "Precise Positioning Using Millimeter Wave Narrow Beamforming" filed on Apr. 14, 2016, the entirety of which is hereby incorporated by reference.

BACKGROUND

The specification relates to determining a location of a vehicle using millimeter wave narrow beamforming.

Some driving functions require location data that describes the precise position of a vehicle. The level of precision required may be lane level accuracy, i.e., accurate to within 3.7 meters or less of the actual position of the vehicle. Examples of driving functions that require lane level accuracy include: certain safety warnings; and autonomous driving. State of the art global positioning systems (herein "GPS") are only accurate to within ten meters of the actual position of the vehicle in challenged environments such as urban street canyons. As a result, GPS is unable to provide location data for vehicles that is sufficiently accurate to enable driving functions that require lane level accuracy.

SUMMARY

Disclosed are implementations of a millimeter wave positioning system (herein "mmWave positioning system") and an associated method for determining positional information describing a location of a vehicle using millimeter wave narrow beam forming. In some implementations, the positional information may be accurate to within one meter or less while the vehicle is in motion at typical highway speeds.

In some implementations, the mmWave positioning system downloads a map or receives the map from a roadside unit via dedicated short range communication (or, optionally, via cellular network communication (e.g., LTE and 5G) or some other wireless communication).

In some implementations, the roadside unit transmits a sequence of training packets such that a different training packet is transmitted on each of the narrow beams available from the roadside unit. Each training packet may include one or more of the following elements (1) power data that can be used to measure the receive power of the narrow beam that transmitted the packet; and (2) a header including a beam ID, which is a unique identifier of the narrow beam that transmitted the packet. The mmWave positioning system may receive one or more training packets.

In some implementations, the mmWave positioning system determines which of the training packets has the highest power level.

In some implementations, the mmWave positioning system determines positional information for the vehicle based on one or more of the following: (1) the beam ID for the training packet with the highest power level and (2) the location for the beam ID as indicated by the map. The map may include a table describing a set of unique identifiers for the narrow beams and the location coordinates for the beam spot for the narrow beam.

Some of the implementations of the mmWave positioning system described herein include numerous benefits. For example, the mmWave positioning system may provide positional information for moving vehicles that is accurate to within 1 m or less. Another example benefit of the mmWave positioning system includes the ability to determine positional information for moving vehicles in tunnels or other locations where GPS does not work. Yet another example benefit of the mmWave positioning system includes the ability to implement the mmWave positioning system in existing vehicles with minimal hardware modification to conventional millimeter wave transceivers; as a result, the mmWave positioning system is easy and cheap to deploy among individual vehicles or a fleet of vehicles. Yet another example benefit of the mmWave positioning system is that it may include no bandwidth requirement; by comparison, positioning technologies such as radar have an accuracy that is inversely proportional to bandwidth. Yet another example benefit of the mmWave positioning system includes a low processing complexity; as a result, the positional information may be determined in real time or near real time following receipt of the one or more training packets.

Additional implementations of the mmWave positioning system will now be described. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method implemented by a vehicle, the method including: receiving by a vehicle, via a dedicated short range communication message transmitted by a roadside unit, map data for a geographic region; receiving, via a plurality of millimeter wave narrow beams transmitted by the roadside unit via millimeter wave communication, a set of training packets; analyzing the set of training packets to identify a training packet included in the set of training packets that has a highest receive power level among the set of training packets; and determining positional information for the vehicle based on the training packet included in the set of training packets that has the highest receive power level and the map data; where (1) each of the plurality of millimeter wave narrow beams includes only one training packet, (2) each of the plurality of millimeter wave narrow beams is directed at a roadway traveled by the vehicle to form a beam spot on the roadway so that the plurality of millimeter wave narrow beams forms a plurality of beam spots on the roadway and (3) each of the plurality of beam spots includes an area of the roadway that is not covered by the other beam spots in the plurality of beam spots so that each beam spot corresponds to a different location on the roadway; where the map data describes, for each of the millimeter wave narrow beams included in the plurality of millimeter wave narrow beams, a spot ID that uniquely identifies the beam spot formed by the millimeter wave narrow beam and location data describing a location of the beam spot formed by the millimeter wave narrow beam; where each training packet includes power data describing a receive power level for the training packet and a beam ID which uniquely identifies the millimeter wave narrow beam that transmitted the training packet; where analyzing the set of training packets to identify the training packet included in the set of training packets that has the highest receive power level includes analyzing the power data for each training packet to identify the beam ID associated with the training packet having the highest receive power level; where determining the positional information for the vehicle based on the training packet included in the set of training packets that has the highest receive power level includes analyzing the map data to identify the spot ID described by the map data that matches the beam ID associated with the training packet having the highest receive power level and determining the positional information for the vehicle to be the location described by the location data associated with the spot ID; and where the positional information is accurate to within one meter or less of an actual position of the vehicle in a real world. Other embodiments of this aspect include corresponding computer systems, apparatus, and computer programs recorded on one or more computer storage devices, each configured to perform the actions of the methods.

One general aspect includes a method including: receiving by a vehicle, via a plurality of millimeter wave narrow beams transmitted by a roadside unit via millimeter wave communication, a set of training packets that each uniquely identify a position on a portion of a roadway, where the vehicle is located on the roadway and within a millimeter wave communication range of the roadside unit and each of the training packets included in the set of training packets is associated with only one of the millimeter wave narrow beams included in the plurality of millimeter wave narrow beams transmitted by the roadside unit; analyzing the set of training packets to identify a training packet included in the set of training packets that has a highest receive power level among the set of training packets; determining the position uniquely identified by the training packet included in the set of training packets that has the highest receive power level among the set of training packets; determining positional information for the vehicle based on the position uniquely identified by the training packet included in the set of training packets that has the highest receive power level, where the positional information describes a location of the vehicle on the roadway as being within a beam spot formed by the millimeter wave narrow beam that transmitted the training packet included in the set that has the highest receive power level. Other embodiments of this aspect include corresponding computer systems, apparatus, and computer programs recorded on one or more computer storage devices, each configured to perform the actions of the methods.

Implementations may include one or more of the following features. The method where each of the plurality of millimeter wave narrow beams includes only one training packet; where each of the plurality of millimeter wave narrow beams is directed at the roadway traveled by the vehicle to form a different beam spot on the roadway so that the plurality of millimeter wave narrow beams forms a plurality of beam spots on the roadway; and where each of the plurality of beam spots includes an area of the roadway that is not covered by the other beam spots in the plurality of beam spots so that each beam spot corresponds to a different location on the roadway. The method where the vehicle includes a non-transitory memory that stores map data that describes, for each of the millimeter wave narrow beams included in the plurality of millimeter wave narrow beams, a spot ID that uniquely identifies the beam spot formed by the millimeter wave narrow beam and location data describing a location of the beam spot formed by the millimeter wave narrow beam on the roadway. The method where each training packet includes power data describing a receive power level for the training packet and a beam ID which uniquely identifies the millimeter wave narrow beam that transmitted the training packet; and where analyzing the set of training packets to identify the training packet included in the set that has the highest receive power level includes analyzing the power data for each training packet to identify the beam ID associated with the training packet having the highest receive power level. The method where each training packet includes power data describing a receive power level for the training packet and a beam ID which uniquely identifies the millimeter wave narrow beam that transmitted the training packet; where analyzing the set of training packets to identify the training packet included in the set that has the highest receive power level includes analyzing the power data for each training packet to identify the beam ID associated with the training packet having the highest receive power level; and where determining the positional information for the vehicle includes analyzing the map data to identify the spot ID described by the map data that matches the beam ID associated with the training packet having the highest receive power level and determining the positional information for the vehicle to be the location described by the location data associated with the spot ID. The method where each training packet includes power data describing a receive power level for the training packet and a beam ID which uniquely identifies the millimeter wave narrow beam that transmitted the training packet. The method where the location of the vehicle described by the positional information is accurate to within one meter or less of an actual position of the vehicle. The method where the actual position of the vehicle is within a tunnel. The method where the actual position of the vehicle is inside a structure having a roof that obscures a sky. The method where the actual position of the vehicle is underground. The method where the actual position of the vehicle is within an urban street canyon. The method where the actual position of the vehicle is a non-top level of a multi-level bridge. Implementations of the described techniques may include hardware, a method or process, or computer software on a computer-accessible medium.

One general aspect includes a system including: a vehicle including a millimeter wave communication unit ("mmWave communication unit") and a non-transitory memory that are communicatively coupled to a millimeter wave positing system and a processor, where the mmWave communication unit receives a plurality of millimeter wave narrow beams that each include a different training packet to form a set of training packets received from the plurality of millimeter wave narrow beams, where each training packet included in the set of training packets includes a beam ID that uniquely identifies which millimeter wave narrow beam transmitted the training packet and power data that describes a receive power level of the training packet; where the non-transitory memory stores map data that describes, for each of the millimeter wave narrow beams included in the plurality of millimeter wave narrow beams, a spot ID that uniquely identifies a beam spot formed by the millimeter wave narrow beam on a roadway and location data associated with the spot ID and describing a location of the beam spot formed by the millimeter wave narrow beam on the roadway; where the millimeter wave positing system receives the set of training packets from the mmWave communication unit and the map data from the non-transitory memory, and where the millimeter wave positioning system includes instructions that, responsive to being executed by the processor, cause the processor to: analyze the set of training packets to identify a training packet included in the set of training packets that has a highest receive power level among the set of training packets; determine the beam ID associated with the training packet included in the set of training packets that has the highest receive power level among the set of training packets; analyze the map data to identify the spot ID described by the map data that at least substantially matches the beam ID associated with the training packet included in the set of training packets that has the highest receive power level; and assign positional information to the vehicle that describes where the vehicle is located, where the positional information indicates that the vehicle is located at the location described by the location data associated with the spot ID. Other embodiments of this aspect include corresponding computer systems, apparatus, and computer programs recorded on one or more computer storage devices, each configured to perform the actions of the methods.

Implementations may include one or more of the following features. The system where the positional information is accurate to within one meter or less of an actual position of the vehicle in a real world. The system where the actual position of the vehicle is within a tunnel. The system where the actual position of the vehicle is inside a structure with a roof. The system where the actual position of the vehicle is underground. The system where the actual position of the vehicle is within an urban street canyon. The system where the actual position of the vehicle is a non-top level of a multi-level bridge. Implementations of the described techniques may include hardware, a method or process, or computer software on a computer-accessible medium.

One general aspect includes a system including: a vehicle including a mmWave communication unit that is communicatively coupled to a millimeter wave positing system and a processor; where the mmWave communication unit receives a first millimeter wave narrow beam and a second millimeter wave narrow beam; where the first millimeter wave narrow beam includes a first training packet that identifies a first receive power of the first millimeter wave narrow beam and a first location of a beam spot on a roadway formed by the first millimeter wave narrow beam; where the second millimeter wave narrow beam includes a second training packet that identifies a second receive power of the second millimeter wave narrow beam; and where the millimeter wave positing system receives the first training packet and the second training packet from the mmWave communication unit, and where the millimeter wave positioning system includes instructions that, responsive to being executed by the processor, cause the processor to: determine that the first receive power is greater than the second receive power; and determine that the vehicle is located in the beam spot on the roadway. Other embodiments of this aspect include corresponding computer systems, apparatus, and computer programs recorded on one or more computer storage devices, each configured to perform the actions of the methods.

Implementations may include one or more of the following features. The system where the vehicle is traveling on the roadway. The system where the vehicle is traveling on the roadway at a speed greater than or equal to fifteen miles per hour. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1A:
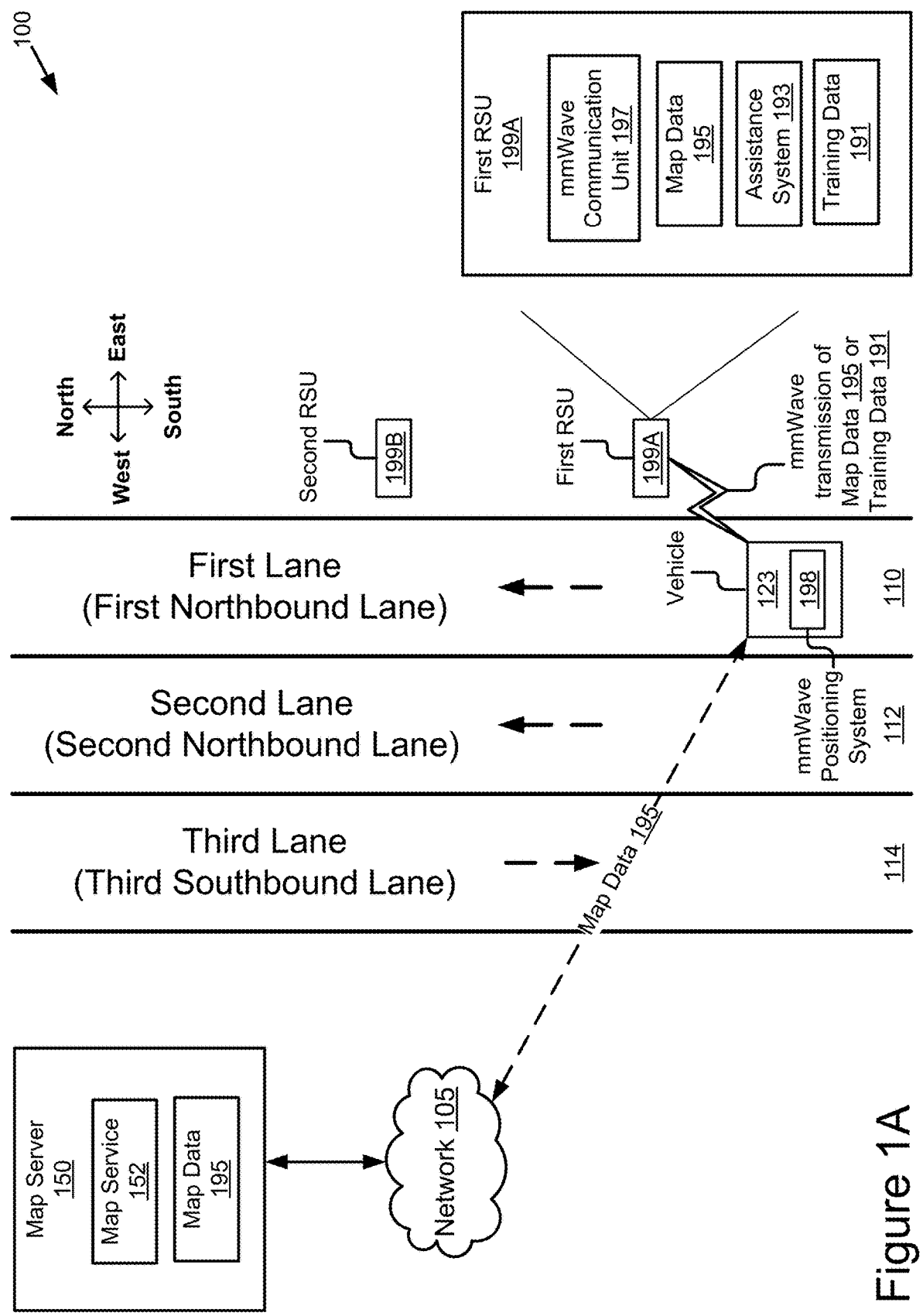
FIG. 1A is a block diagram illustrating an example operating environment for a mmWave positioning system according to some implementations.

Some driving functions require location data that describes the precise position of a vehicle. The level of precision required may be lane level accuracy, i.e., accurate to within 3.7 meters or less of the actual position of the vehicle in the real world. Examples of driving functions that require lane level accuracy include: autonomous driving; a forward collision warning provided by an advanced driver assistance system (herein, "ADAS system") of a vehicle; blind spot warning provided by the ADAS system; lane change warning provided by the ADAS system; and a "do not pass" warning provided by the ADAS system.

State of the art global positioning systems (herein "GPS") are only accurate to within ten meters of the actual position of the vehicle in challenged environments such as urban street canyons. As a result, GPS is unable to provide location data for vehicles that is sufficiently accurate to enable driving functions that require lane level accuracy.

The band of radio frequencies from 30 to 300 gigahertz have wavelengths from ten to one millimeter, giving them the name of the millimeter wave band (herein, "mmBand").

Vehicles are increasing equipped with mmWave communication. A vehicle equipped with a mmWave communication unit may be referred to as "mmWave-equipped." A mmWave-equipped vehicle may include a mmWave antenna and any hardware of software necessary to send and receive mmWave messages using the mmBand, generate mmWave messages and read mmWave messages received via the mmBand.

Vehicles are also increasingly equipped with Dedicated Short Range Communication ("DSRC"). A vehicle equipped with DSRC may be referred to as "DSRC-equipped." A DSRC-equipped vehicle may include a DSRC antenna and any hardware of software necessary to send and receive DSRC message, generate DSRC messages and read DSRC messages.

One type of DSRC message is known as a Basic Safety Message ("BSM" if singular or "BSMs" if plural). DSRC-equipped vehicles broadcast a BSM at a regular interval. The internal may be user adjustable. In some implementations, the BSM is broadcast at an adjustable rate of once every 0.10 seconds.

Another type of communication included in some vehicles is "LTE-V2X," which is similar to DSRC but uses cellular networks and is currently standardized in 3GPP. A LTE-V2X-equipped vehicle communicates with another LTE-V2X-equipped vehicle or road side unit directly with or without the assistance of base stations in cellular networks. LTE-V2X may utilize the same or equivalent messages as BSM.

Another type of communication included in some vehicles is "full-duplex wireless communication" as described in U.S. patent application Ser. No. 14/471,387 entitled "Full-Duplex Coordination System," filed on Aug. 28, 2014, the entirety of which is herein incorporated by reference. Vehicles operable to communicate via full-duplex wireless communication may be referred to as "full-duplex-equipped." A full-duplex-equipped vehicle may include any hardware of software necessary to send and receive full-duplex wireless messages, generate full-duplex wireless messages and read full-duplex wireless messages as described in U.S. patent application Ser. No. 14/471,387.

System Overview

FIG. 1A is a block diagram illustrating a first example operating environment 100 for a mmWave positioning system 198 according to some implementations.

The illustrated operating environment 100 includes: a first lane 110 of a roadway system; a second lane 112 of the roadway system; a third lane 114 of the roadway system; a first roadside unit 199A and a second roadside unit 199B (herein "the first RSU 199A" and the "second RSU 199B" individually, or the "RSU 199" collectively).

The first lane 110, second lane 112 and the third lane 114 may include one or more mmWave-equipped vehicles traveling along the roadway system. For example, the first lane 110 includes a vehicle 123 that is mmWave-equipped. The vehicle 123 may also be DSRC-equipped, LTE-V2X-equipped, or full-duplex-equipped. The vehicle 123 may wirelessly transmit mmWave messages to other entities that are mmWave equipped. Similarly, the vehicle 123 may also wirelessly transmit and receive DSRC, LTE-V2X, or full-duplex messages with other entities that are equipped to send and receive such messages. For example, the RSU 199 may be one or more of the following: mmWave-equipped; DSRC-equipped; LTE-V2X-equipped; and full-duplex-equipped.

In the implementation depicted in FIG. 1A, the first lane 110 and the second lane 112 are both unidirectional lanes with traffic flowing in the North direction (or "heading" North) and the third lane 114 is a unidirectional lane with traffic flowing in the South direction (or "heading" South).

The headings (North, South, East and West) depicted in FIG. 1A are provided by way of example. For example, in FIG. 1A the first lane 110 and the second lane 112 are depicted with traffic flowing in a North direction and the third lane 114 is depicted with traffic flowing in a South direction. However, in practice these lanes 110, 112, 114 may be configured so that traffic flows in different directions. There may also be more or fewer lanes than those depicted in FIG. 1A.

The first RSU 199A includes one or more of the following elements: a mmWave communication unit 197; map data 195; an assistance system 193.

Figure 4:
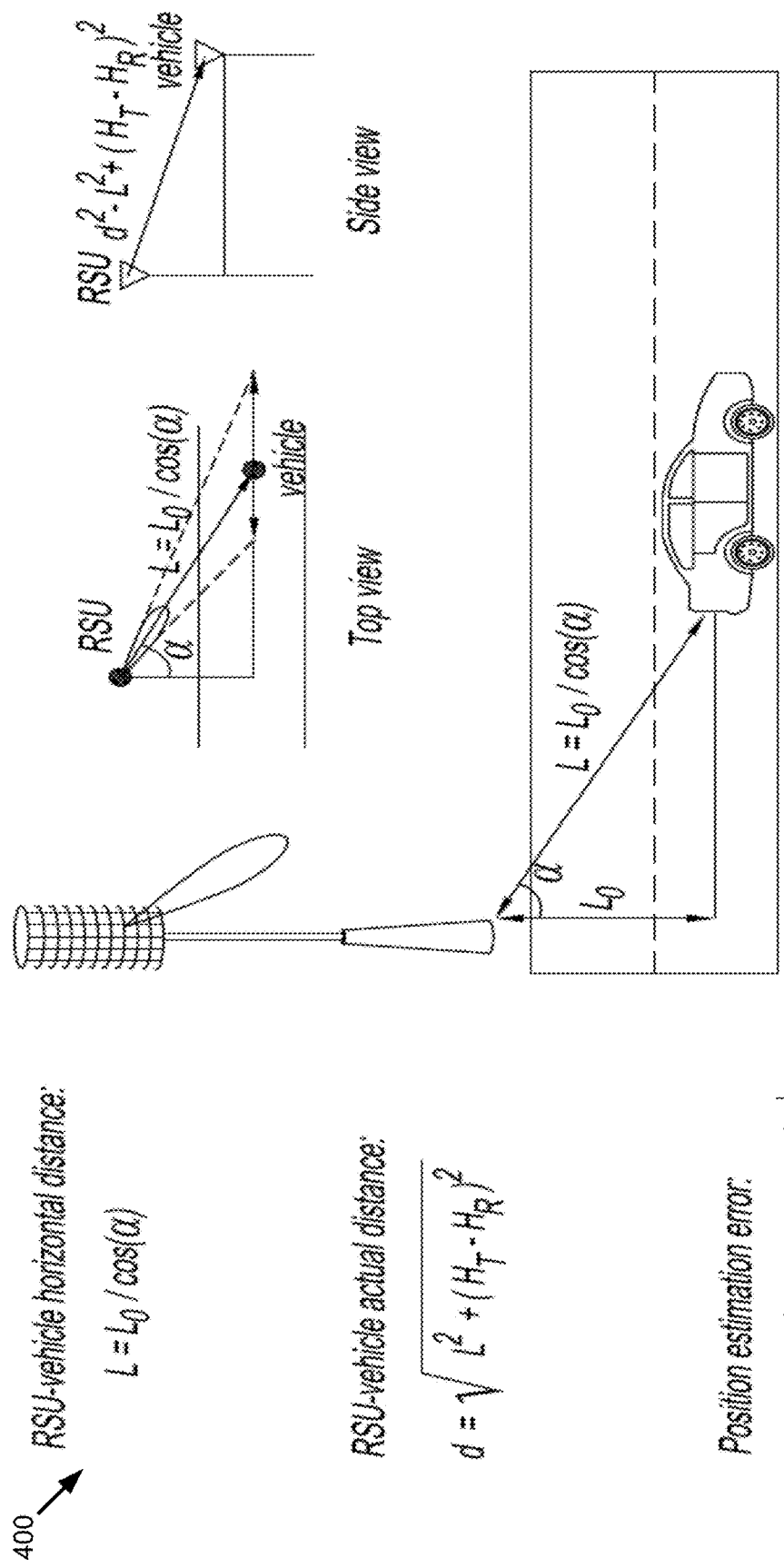
FIG. 4 is a block diagram illustrating a set of equations of operation for determining a position of a vehicle using a plurality of mmWave narrow beams according to some implementations.

The mmWave communication unit 197 wirelessly transmits and receives data to and from the vehicle 123 via mmWave. For example, the mmWave communication unit 197 may include any hardware or software necessary to make the first RSU 199A a mmWave-enabled device. In some implementations, the mmWave communication unit 197 may include a mmWave transmitter and a mmWave receiver. In some implementations, the mmWave communication unit 197 may transmit one or more mmWave narrow beams as depicted in FIGS. 1B, 1C and 4.

Figure 1B:
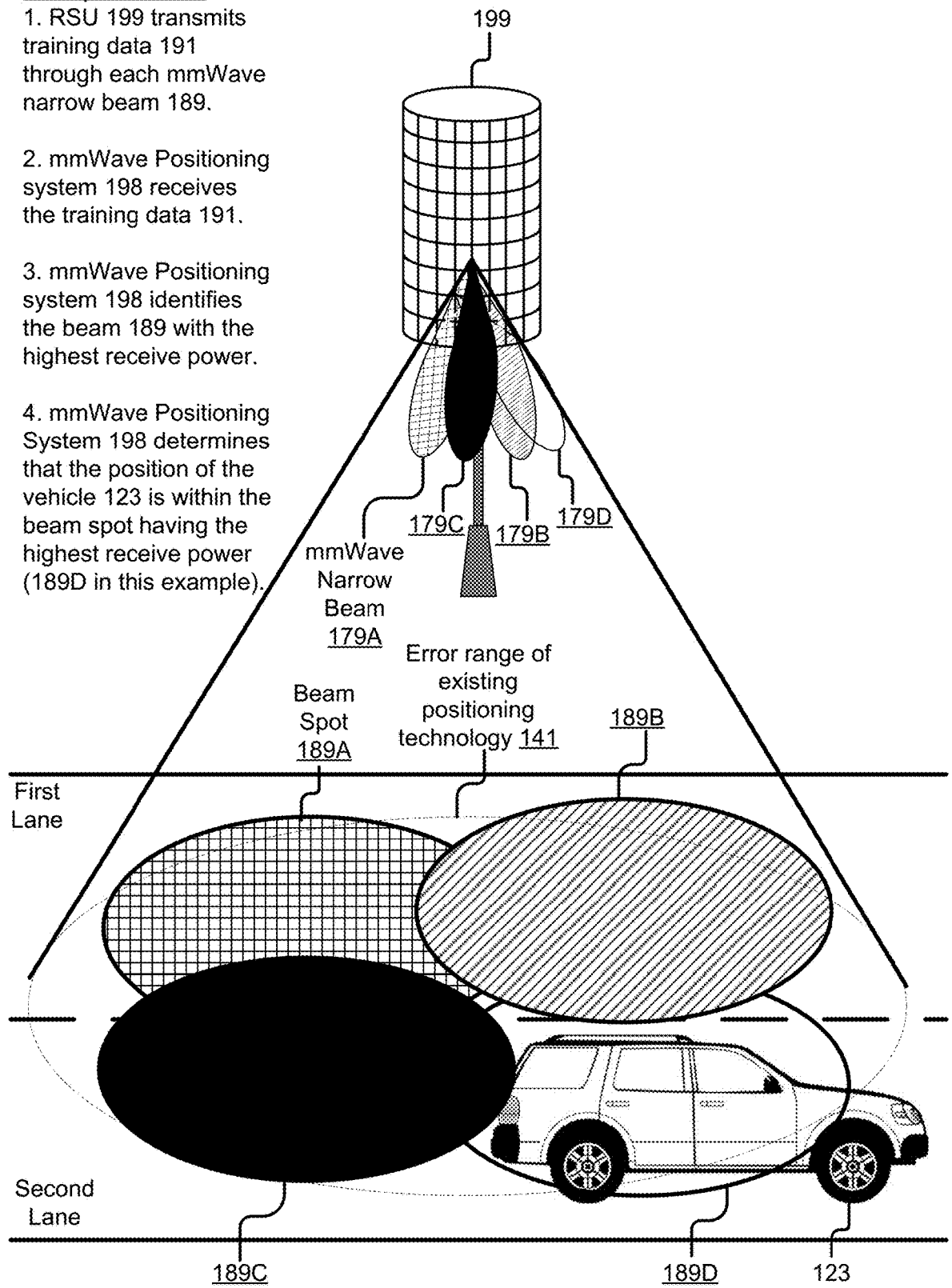
FIG. 1B is a block diagram illustrating an example analysis for determining a position of a vehicle based on a plurality of mmWave narrow beams according to some implementations.
Figure 1C:
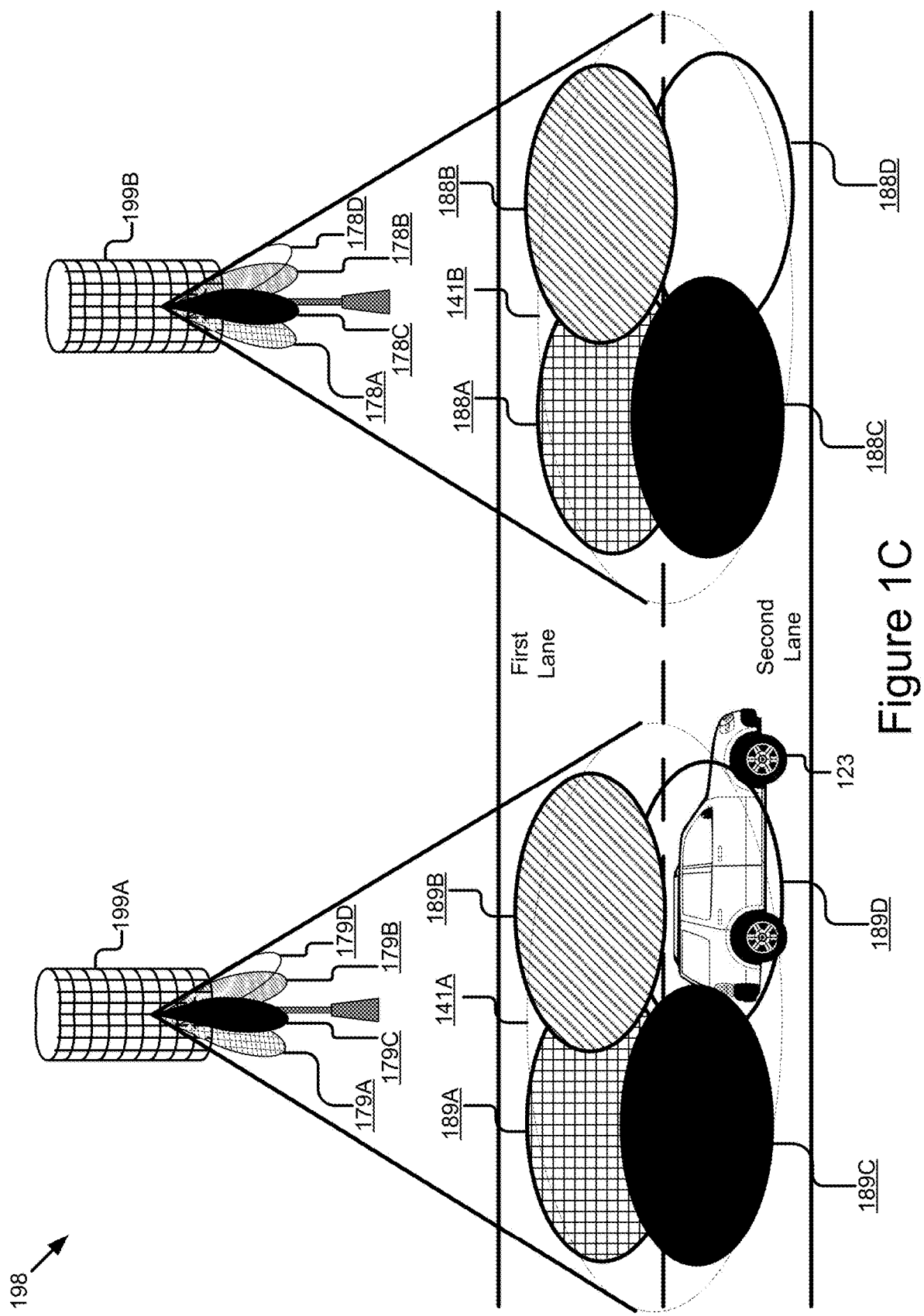
FIG. 1C is a block diagram illustrating an example analysis for determining a position of a vehicle based on a two pluralities of mmWave narrow beams according to some implementations.

In some implementations, the mmWave communication unit 197 may transmit a plurality of mmWave narrow beams contemporaneously or simultaneously (see, e.g., FIGS. 1B and 1C). For example, the mmWave communication unit 197 may include a plurality of mmWave transceivers that are operable to contemporaneously or simultaneously transmit a plurality of mmWave narrow beams as depicted in FIGS. 1B and 1C.

In some implementations, each mmWave narrow beam transmitted by the mmWave communication unit 197 may form a beam spot on the surface of the roadway system. A beam spot may include a beam projection on the surface of the roadway system. A "beam spot" may be analogous to a laser pointer. When a laser pointer is pointed at some surface, it will produce a light spot on that surface. Similarly, pointing a mmWave transmitter at a road surface and transmitting a narrow beam mmWave forms a beam spot on the road surface. The mmWave communication unit 197 is configured so that each of its mmWave transceivers are directed onto the surface of the roadway system so it will produce beam spots on the surface of the roadway system.

For example, referring now to FIG. 1B, the RSU 199 transmits the following: a first mmWave narrow beam 179A that forms a first beam spot 189A on the surface of a first lane; a second mmWave narrow beam 179B that forms a second beam spot 189B on the surface of the first lane; a third mmWave narrow beam 179C that forms a third beam spot 189C on the surface of a second lane (and a portion of the first lane); and a fourth mmWave narrow beam 179D that forms a fourth beam spot 189D on the surface of the second lane (and a portion of the first lane).

These mmWave narrow beams 179A, 179B, 179C, 179D may be configured so that each beam spot 189A, 189B, 189C, 189D covers an area of interest. In some implementations, each mmWave narrow beam 179A, 179B, 179C, 179D transmitted by the mmWave communication unit 197 may be uniquely and statically targeted at a different portion of the surface of the roadway system formed by the first lane and the second lane.

For example, the individual mmWave transceivers of the mmWave communication unit 197 included in the RSU 199 may be "statically" directed to a portion of the surface of the roadway system because the orientation of the individual mmWave transceivers may be fixed so that they always direct mmWave transmissions to the same portion of the surface of the roadway system. For example, the mmWave transceiver that transmits the first mmWave narrow beam 179A is statically oriented so that it always transmits a mmWave narrow beam that forms the first beam spot 189A on the same portion of the first lane.

Similarly, the first mmWave narrow beam 179A may be "uniquely" directed to a portion of the surface of the roadway system because the first beam spot 189A covers portions of the surface of the roadway system that are not covered by the other beam spots 189B, 189C, 189D. For example, even though the third beam spot 189C and the second beam spot 189B overlap a portion of the first beam spot 189A, the first beam spot 189A still covers portions of the first lane that are not covered by the third beam spot 189C or the second beam spot 189B. This is similarly true of each of the beam spots 189A, 189B, 189C, 189D formed by the mmWave narrow beams 179A, 179B, 179C, 179D transmitted by the RSU 199 so that each of the mmWave narrow beams 179A, 179B, 179C, 179D is uniquely directed of a portion of the surface of the roadway system.

Referring back to FIG. 1A and the elements of the first RSU 199. The assistance system 193 may include code and routines operable to cause the mmWave communication unit 197 to transmit the map data 195 or the training data 191 to the vehicle 123 via a mmWave communication. For example, the assistance system 193 may cause the mmWave communication unit 197 to transmit the map data 195 to the vehicle 123 via mmWave communication. The assistance system 193 may cause the mmWave communication unit 197 to transmit one or more mmWave narrow beams (e.g., mmWave narrow beams 179A, 179B, 179C, 179D depicted in FIG. 1B). Each of the one or more mmWave narrow beams may include training data 191 that is specific for that particular mmWave narrow beam.

The map data 195 may include information that may be used by the mmWave positioning system 198 of the vehicle 123 to understand or make use of the training data 191. The map data 195 may uniquely identify one or more beam spots present on the roadway system and the location of these one or more beam spots. For example, the map data 195 may describe one or more of the following: (1) the locations of one or more beam spots present on the roadway system; and (2) for each of the one or beam spots described by the map data 195, a spot identifier (herein "a spot ID" or "the spot ID" if singular, "spot IDs" if plural) that uniquely identifies that beam spot. For each beam spot described by the map data 195, the location data may describe an area of the roadway surface covered by that particular beam spot. For each beam spot described by the map data 195, the location data may include a set of latitude and longitude coordinates or some other form of data that is usable to describe a pinpoint location within the beam spot or the location of an area formed by the beam spot. Accordingly, the map data 195 may describe a plurality of spot IDs and location data that describes the geographic locations of the beam spots identified by the different spot IDs.

In some implementations, the map data 195 is not data received from a global positioning system.

In some implementations, each mmWave narrow beam may include a combination of training data 191 that is not present in any other mmWave narrow beam. For example, each mmWave narrow beam may include training data 191 that describes one or more of the following: (1) the receive power of that particular mmWave narrow beam (e.g., the signal strength or power level of the mmWave narrow beam upon receipt by the vehicle 123); (2) a beam identifier (herein "a beam ID" or "the beam ID" if singular, "beam IDs" if plural) that uniquely identifies this particular mmWave narrow beam; and (3) location data describing the location where the mmWave meets the roadway surface. The location data is an optional feature of the training data 191. The receive power may be described by power data that is included in the training data 191. The beam ID may be included in a header of the training data 191.

In some implementations, a beam ID included in the training data 191 may correspond to a single spot ID described by the map data 195. For example, the map data 195 may describe a plurality of spot IDs and the locations of the beam spots identified by the spot IDs. Since each of the beam spots identified by the spot IDs is formed by a mmWave narrow beam, and the mmWave narrow beams are static so that they always form a beam spot in the same location on the surface of the roadway system, the mmWave narrow beams identified by the beam IDs may match the spot IDs described by the map data 195. For example, at the beam ID may be "XYZ" and the spot ID may be "XYZ" and this matching may indicate that the beam ID identifies the mmWave narrow beam that forms the beam spot identified by the matching spot ID. In some examples, one or more characters or bits of the beam IDs and the spot IDs may match or correlate to indicate the relationship between the beam ID and the spot ID so that the entire identifiers do not have to match.

In some implementations, the map data 195 may describe beam spots that are formed by a plurality of RSUs 199. For example, the map data 195 may describe the beam spots that are formed by the first RSU 199A and the second RSU 199B. By contrast, the training data 191 of the first RSU 199A may be specific to the first RSU 199A. For example, the training data 191 of the first RSU 199A may only describe the mmWave narrow beams that are transmitted by the first RSU 199A. Similarly, the second RSU 199B may store and transmit its own training data 191 that describes the mmWave narrow beams that are transmitted by the second RSU 199B

The first RSU 199A may include a processor that is operable to execute the assistance system 193. The processor of the first RSU 199A may include functionality similar to the processor 225 described below with reference to FIG. 2. The first RSU 199A may include a non-transitory storage medium that is operable to store the map data 195 and the training data 191. Optionally, the assistance system 193 may be stored on the non-transitory memory. The non-transitory medium of the first RSU may include functionality similar to the memory 227 described below with reference to FIG. 2. The processor of the first RSU 199A may be communicatively coupled to the assistance system 193, the mmWave communication unit 197 and the non-transitory memory storing the map data 195 and the training data 191. The processor may access and execute the assistance system 193 stored in the non-transitory memory. The processor may execute the assistance system 193, retrieve the map data 195 or the training data 191 and cause the mmWave communication unit 197 to wirelessly transmit the map data 195 or the training data 191 to the vehicle 123 via mmWave communication.

The second RSU 199B includes elements and functionality similar to the first RSU, and so, that description will not be repeated here. The second RSU 199B may include training data 191 that is different than that which is stored by the first RSU 199A. For example, the training data 191 of the second RSU 199B may describe mmWave narrow beams that are transmitted by the second RSU 199B whereas the training data 191 of the first RSU 199A may describe the mmWave narrow beams that are transmitted by the first RSU 199A. The second RSU 199B is described in more detail below with reference to FIG. 1C.

In some implementations, one or more of the first RSU 199A or the second RSU 199B may include an onboard unit (herein an "OBU" if singular or "OBUs" if plural) present in a dynamic device such as a vehicle or some other device.

The vehicle 123 may include an automobile, a bus, an airplane, a drone, a bionic implant, or any other mobile system. In some implementations, the vehicle 123 may include a computing device that includes a non-transitory memory and a processor. For example, the vehicle 123 may include one or more onboard vehicle computers, engine control units, OBUs or any other processor-based computing device that is conventional to a vehicle 123.

The vehicle 123 may include any hardware or software necessary to be one or more of the following: mmWave-enabled; DSRC-enabled; LTE-V2X-enabled; and full-duplex-enabled. For example, the vehicle 123 may include a mmWave receiver and transceiver so that the vehicle 123 is operable to send mmWave communications to other mmWave-enabled devices, receive mmWave communications (including narrow mmWave beams) and read mmWave communications that it receives. In some implementations, the communication unit 245 described below with reference to FIG. 2 includes the hardware and software necessary to make the vehicle 123 mmWave-enabled (as well as DSRC-enabled, LTE-V2X-enabled, or full-duplex-enabled).

The vehicle 123 may include a mmWave positioning system 198. The mmWave positioning system 198 may include code and routines that are operable to receive the map data 195 and the training data 191 and determine the position of the vehicle 123 based at least in part on the map data 195 and the training data.

For example, the mmWave positioning system 198 receives map data 195. The map data 195 may be transmitted by any RSU 199. The mmWave positioning system 198 may store the map data 195 on the non-transitory memory of the vehicle 123. The mmWave positioning system 198 may receive training data 191 from an RSU 199 (which may or may not be the same RSU 199 that transmitted the map data 195). Assume the vehicle 123 is traveling in the first lane 110 of FIG. 1A. The training data 191 may be received via a narrow mmWave beam that forms a beam spot on the surface of the first lane 110. The training data 191 may be included in a "training packet" that is encoded in the mmWave narrow beam. A training packet may include a data set present in an individual mmWave narrow beam that includes the training data 191 for that mmWave narrow beam. The mmWave positioning system 198 may receive other training data 191 from other mmWave narrow beams. The training data 191 received by the mmWave positioning system 198 may be collectively referred to as a "set of training packets."

In some implementations, the mmWave positioning system 198 may analyze the set of training packets to identify the training packet included in the set of training packets that has the highest receive power level. For example, the mmWave positioning system 198 identifies the power data for each training packet. The mmWave positioning system 198 may analyze all the power data included in the set of training packets to identify which of the training packets has the highest power level. The mmWave positioning system 198 analyzes the power data for each training packet to identify the beam ID associated with the training packet having the highest receive power level.

In some implementations, the mmWave positioning system 198 may determine positional information for the vehicle 123 based on the training packet included in the set of training packets that has the highest receive power level. For example, the mmWave positioning system 198 analyzes the map data 195 to identify the spot ID described by the map data 195 that matches the beam ID associated with the training packet having the highest receive power level. The mmWave positioning system 198 determine that the positional information for the vehicle is equal to the location described by the location data associated with the spot ID.

Research has shown that the positional information generated using this methodology is far more accurate than GPS. For example, research indicates that this methodology yields positional information that is accurate to within one meter or less of the actual position of the vehicle in a real world.

In some implementations, the map data 195 may be provided by a map service 152. For example, the map data 195 may be stored in a non-transitory memory of a map server 150. The map server 150 may include a hardware server. For example, the map server 150 may include a processor-based computing device such as a computer that includes server software executed by a processor of the server. The map service 152 may include code and routines operable to receive requests for map data 195 from a vehicle 123 and wirelessly transmit the map data 195 to the vehicle 123 via a network 105. The signal line between the network 105 and the vehicle 123 is depicted with a dashed line in FIG. 1A to indicate that this is an optional feature of the environment 100 since the RSU 199 may provide the map data 195 to the vehicle 123.

The network 105 can be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some implementations, the network 105 may be a peer-to-peer network. The network 105 may also be coupled to or includes portions of a telecommunications network for sending data in a variety of different communication protocols. In some implementations, the network 105 includes Bluetooth communication networks or a cellular communications network for sending and receiving data including via DSRC, short messaging service (SMS), multimedia messaging service (MMS), hypertext transfer protocol (HTTP), direct data connection, WAP, e-mail, millimeter wave communication, etc.

In some implementations, the receive power level for each mmWave narrow beam is based on a determination of which mmWave narrow beam received by the mmWave positioning system 189 has the highest signal strength. This will be whichever mmWave narrow beam is directed at the vehicle 123 so that the vehicle 123 is within the beam spot formed by the mmWave narrow beam.

Referring now to FIG. 1B, depicted is a block diagram illustrating an example analysis for determining a position of a vehicle 123 based on a plurality of mmWave narrow beams 179A, 179B, 179C, 179D according to some implementations.

In FIG. 1B, the RSU 199 is transmitting four mmWave narrow beams 179A, 179B, 179C, 179D. The first mmWave narrow beam 179A forms a first beam spot 189A. The second mmWave narrow beam 179B forms a second beam spot 189B. The third mmWave narrow beam 179C forms a third beam spot 189C. The fourth mmWave narrow beam 179D forms a fourth beam spot 189D.

The RSU 199 may transmit training data 191 through each mmWave narrow beam 179A, 179B, 179C, 179D (may be referred to herein as "mmWave narrow beam 179" if generally referencing in the singular). The training data 191 for each mmWave narrow beam 179 may be including in a training packet encoded in that mmWave narrow beam 179.

The vehicle 123 includes a mmWave positioning system 198 (not pictured). The mmWave positioning system 198 may receive the training data 191. In some implementations, the mmWave positioning system 198 may receive training data 191 from a plurality of mmWave narrow beams. For example, the mmWave positioning system 198 may receive training data 191 from the each of the mmWave narrow beams 179A, 179B, 179C, 179D depicted in the FIG. 1B.

Each of the training packets may include its own power data and beam ID. The mmWave positioning system 198 may identify the beam ID for the training packet that has the highest receive power based on the power data for each training packet.

The mmWave positioning system 198 may determine that the position of the vehicle 123 is within the beam spot having the highest receive power. For example, in FIG. 1B, the vehicle 123 is positioned in the fourth beam spot 189D and so the training packet encoded in the fourth mmWave narrow beam 179D will have the highest receive power level (since, for example, the fourth mmWave narrow beam 179D will have the strongest signal strength as depicted in FIG. 1B). The mmWave positioning system 198 may identify the beam ID for the training packet transmitted by the fourth mmWave narrow beam 179D. The mmWave positioning system 198 may cross reference the beam ID for the fourth mmWave narrow beam 179D and identifying a matching beam ID. The mmWave positioning system 198 may identify the location data associated with the matching beam ID. This location data describes the location of the fourth beam spot 189D. The mmWave positioning system 198 may determine that the position, or location, of the vehicle 123 is the same as the location described by this location data.

An example benefit of the mmWave positioning system 198 is depicted with reference to element 141 which depicts the error range of existing positioning technology (e.g., GPS). For example, GPS technology is so inaccurate it can only identify the position of the vehicle 123 as being within the area defined by element 141. By comparison, the mmWave positioning system 198 is able to identify the position of the vehicle 123 as being within the area defined by the fourth beam spot 189D.

Referring now to FIG. 1C, depicted is a block diagram illustrating an example analysis for determining a position of a vehicle 123 based on a two pluralities of mmWave narrow beams according to some implementations.

FIG. 1C depicts a first RSU 199A, a second RSU 199B and a vehicle 123 traveling on a roadway system that includes a first lane and a second lane.

The first RSU 199A is transmitting four mmWave narrow beams 179A, 179B, 179C, 179D. The first mmWave narrow beam 179A forms a first beam spot 189A. The second mmWave narrow beam 179B forms a second beam spot 189B. The third mmWave narrow beam 179C forms a third beam spot 189C. The fourth mmWave narrow beam 179D forms a fourth beam spot 189D. Element 141A indicates the precision of conventional position technology such as GPS.

The second RSU 199B is transmitting four mmWave narrow beams 178A, 178B, 178C, 178D. The fifth mmWave narrow beam 178A forms a fifth beam spot 188A. The sixth mmWave narrow beam 178B forms a sixth beam spot 188B. The seventh mmWave narrow beam 178C forms a seventh beam spot 188C. The eighth mmWave narrow beam 178D forms an eighth beam spot 188D. Element 141B indicates the precision of conventional position technology such as GPS.

As the vehicle 123 travels on the roadway system, it may change positions over time. A plurality of RSUs 199 may be installed along the roadway system to assist the vehicle 123 to determine its position as the position of the vehicle 123 changes over time.

Figure 2:
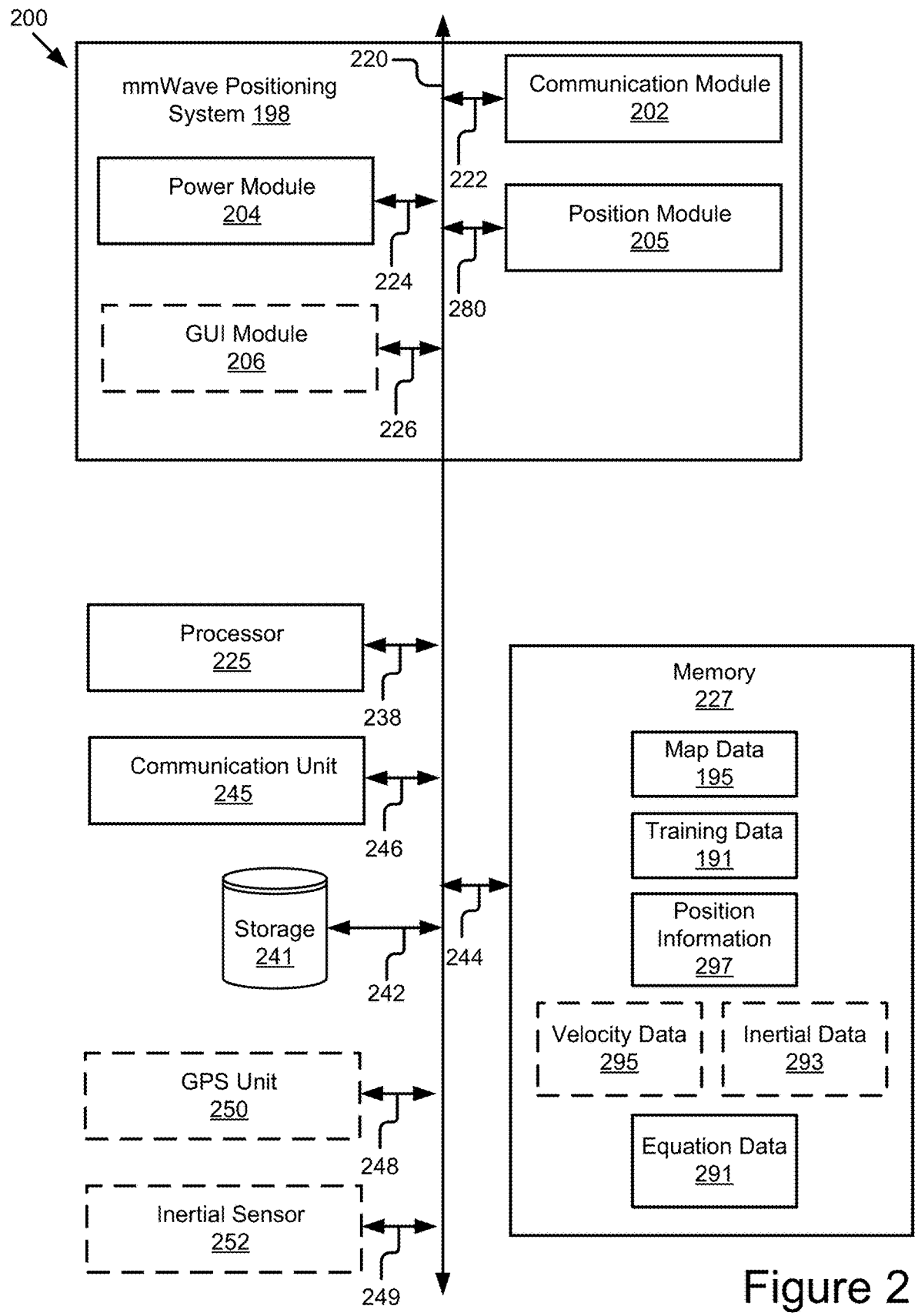
FIG. 2 is a block diagram illustrating an example computer system including the mmWave positioning system according to some implementations.

Referring now to FIG. 2, a block diagram illustrating an example computer system 200 including the mmWave positioning system 198 according to some implementations. The computer system 200 may include an onboard vehicle computer, engine control unit or some other processor-based computing device of the vehicle 123.

The computer system 200 may include one or more of the following elements according to some implementations: the mmWave positioning system 198; a processor 225; a communication unit 245; a storage 241; a memory 227; a GPS unit 250; and an inertial sensor 252. The GPS unit 250 and the inertial sensor 252 are depicted with a dashed line in FIG. 2 to indicate that they are optional features of the computer system 200. The components of the computer system 200 are communicatively coupled by a bus 220.

In the illustrated implementation, the processor 225 is communicatively coupled to the bus 220 via a signal line 238. The memory 227 is communicatively coupled to the bus 220 via a signal line 244. The communication unit 245 is communicatively coupled to the bus 220 via a signal line 246. The storage 241 is communicatively coupled to the bus 220 via a signal line 242. The GPS unit 250 is communicatively coupled to the bus 220 via a signal line 248. The inertial sensor 252 is communicatively coupled to the bus 220 via a signal line 249.

The processor 225 includes an arithmetic logic unit, a microprocessor, a general purpose controller, or some other processor array to perform computations and provide electronic display signals to a display device. The processor 225 processes data signals and may include various computing architectures including a complex instruction set computer (CISC) architecture, a reduced instruction set computer (RISC) architecture, or an architecture implementing a combination of instruction sets. Although FIG. 2 includes a single processor 225, multiple processors may be included. Other processors, operating systems, sensors, displays, and physical configurations may be possible.

The memory 227 stores instructions or data that may be executed by the processor 225. The memory 227 is coupled to the bus 220 for communication with the other components via signal line 244. The instructions or data may include code for performing the techniques described herein. The memory 227 may be a dynamic random access memory (DRAM) device, a static random access memory (SRAM) device, flash memory, or some other memory device. In some implementations, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 2, the memory 227 stores: the map data 195; the training data 191; positional information 297; velocity data 295; inertial data 293; and equation data 291. The map data 195 and the training data 191 were described above with reference to FIGS. 1A, 1B and 1C, and so, those descriptions will not be repeated here. The velocity data 295 and the inertial data 293 are depicted with a dashed line in FIG. 2 to indicate that they are optional features of the computer system 200.

The positional information 297 may include the location data associated with the spot ID that matches the beam ID for the training data 191 that has the highest receive power.

The velocity data 295 may include data received from the GPS unit 250 that describes the velocity of the vehicle 123.

The inertial data 293 may include data received from the inertial sensor 252 that describes the inertia of the vehicle 123.

In some implementations, one or more of the velocity data 295 and the inertial data 293 may optionally be used by the mmWave positioning system 198 to provide a dead reckoning of the position of the vehicle 123.

Figure 5:
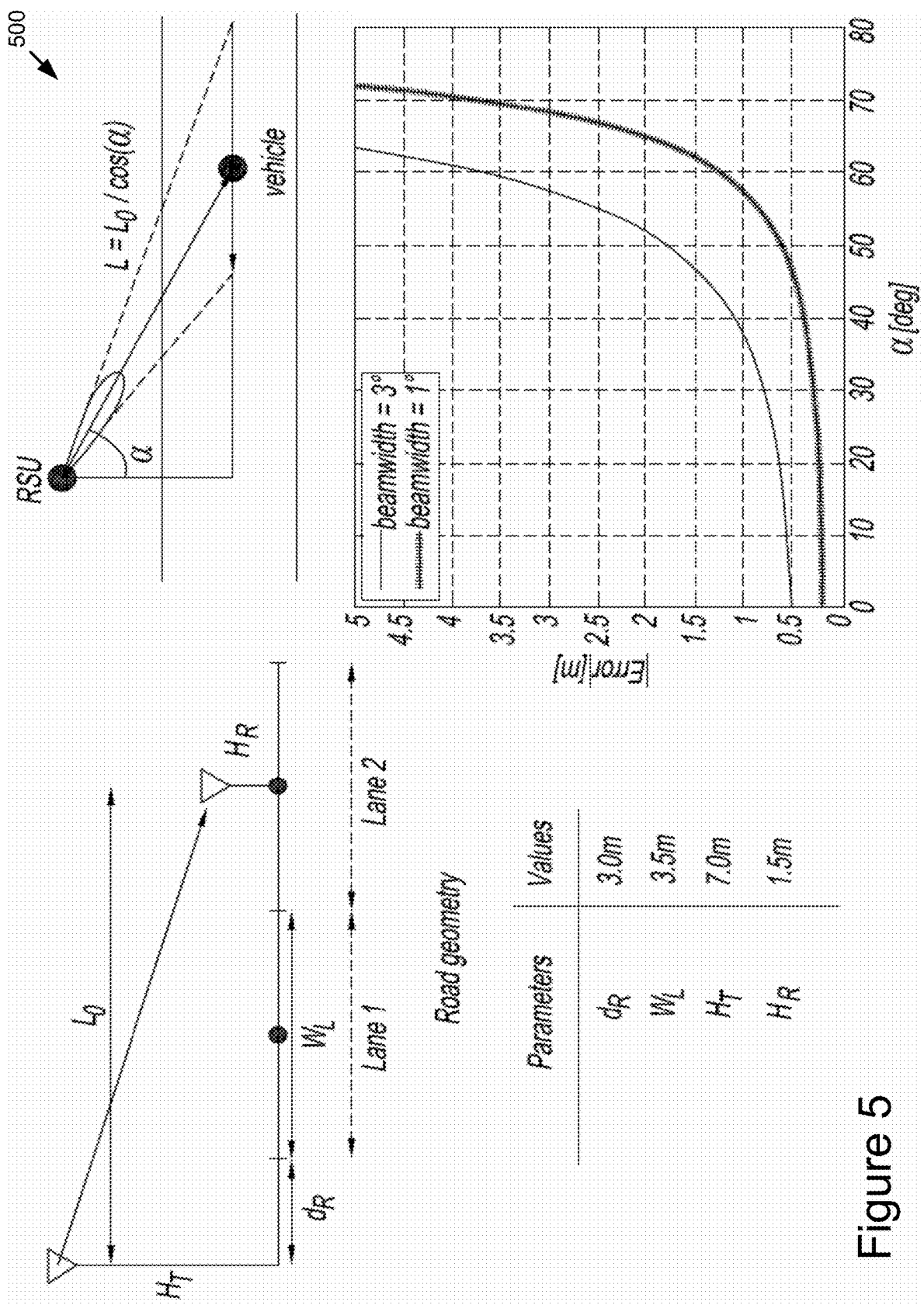
FIG. 5 is a block diagram illustrating an example of using the equations of operations for determining a position of a vehicle using a plurality of mmWave narrow beams according to some implementations.

FIGS. 4 and 5 depict example equations of operations that may be used by the mmWave positioning system 198 to determine the positional information 297 for the vehicle 123. The equation data 291 may describe any data necessary for the mmWave positioning system 198 to use these equations of operation. For example, the equation data 291 may describe one or more of the following: a height of the height of the RSU 199 relative to the roadway surface ($H_T$); a width of a lane of the roadway system ($W_L$); a height of the mmWave receiver of the vehicle 123 relative to the roadway surface ($H_R$); and the distance from the edge of the lane closest to the RSU 199 to the RSU ($d_R$). Other information may be included in the equation data 291.

In some implementations, the equation data 291 may be an element of the map data 195. In some implementations, the equation data 291 may be an element of the training data 191.

In some implementations, sensors of the vehicle 123 may determine the equation data 291 by measuring one or more physical properties of the environment proximate to the vehicle 123.

The communication unit 245 transmits and receives data to and from the network 105 or to another communication channel such as mmWave. For example, the communication unit 245 may include a mmWave transceiver and a mmWave receiver and any other hardware or software necessary to make the computer system 200 a mmWave-enabled device. The mmWave receiver and the mmWave transceiver may be mounted to the vehicle 123 to send and receive mmWave communications.

In some implementations, the communication unit 245 includes a port for direct physical connection to the network 105 or to another communication channel. For example, the communication unit 245 includes a USB, SD, CAT-5, or similar port for wired communication with the network 105. In some implementations, the communication unit 245 includes a wireless transceiver for exchanging data with the network 105 or other communication channels using one or more wireless communication methods, including IEEE 802.11, IEEE 802.16, BLUETOOTH®, or another suitable wireless communication method.

In some implementations, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 245 includes a wired port and a wireless transceiver. The communication unit 245 also provides other conventional connections to the network 105 for distribution of files or media objects using standard network protocols including TCP/IP, HTTP, HTTPS, and SMTP, millimeter wave, DSRC, etc.

The storage 241 can be a non-transitory storage medium that stores data for providing the functionality described herein. The storage 241 may be a dynamic random access memory (DRAM) device, a static random access memory (SRAM) device, flash memory, or some other memory devices. In some implementations, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The GPS unit 250 may include a conventional global positioning system. The inertial sensor 252 may include a conventional inertial sensor.

The mmWave positioning system 198 may be operable to execute one or more steps of the method 300 described below with reference to FIG. 3. In the illustrated implementation shown in FIG. 2, the mmWave positioning system 198 includes a communication module 202, a power module 204, a position module 205 and a graphical user interface module 206 ("GUI module 206"). The GUI module 206 is depicted with a dashed line in FIG. 2 to indicate that this is an optional feature of the mmWave positioning system 198. These components of the mmWave positioning system 198 are communicatively coupled to each other via the bus 220.

In some implementations, components of the mmWave positioning system 198 can be stored in a single server or device. In some other implementations, components of the mmWave positioning system 198 can be distributed and stored across multiple servers or devices.

The communication module 202 can be software including routines for handling communications between the mmWave positioning system 198 and other components of the computer system 200. In some implementations, the communication module 202 can be a set of instructions executable by the processor 225 to provide the functionality described below for handling communications between the mmWave positioning system 198 and other components of the computer system 200. In some implementations, the communication module 202 can be stored in the memory 227 of the computer system 200 and can be accessible and executable by the processor 225. The communication module 202 may be adapted for cooperation and communication with the processor 225 and other components of the computer system 200 via signal line 222.

The communication module 202 sends and receives data, via the communication unit 245, to and from the RSU 199 and the network 105. For example, the communication module 202 receives, via the communication unit 245, the map data 195 or the training data 191.

In some implementations, the communication module 202 receives data from components of the mmWave positioning system 198 and stores the data in one or more of the storage 241 and the memory 227. For example, the communication module 202 receives the positional information 297 from the position module 205 and stores the positional information 297 in the memory 227.

In some implementations, the communication module 202 may handle communications between components of the mmWave positioning system 198. For example, the communication module 202 receives velocity data 295 from the GPS unit 250 and stores the velocity data 295 in the memory 227.

The power module 204 can be software including routines for analyzing the power data included in a set of training packets to determine which of the training packets has the highest receive power.

In some implementations, the power module 204 may analyze the signal strength of one or more mmWave narrow beams to determine which one of the mmWave narrow beams has the highest receive power, and the power module 204 may determine that the training packet received from this mmWave narrow beam has the highest receive power. For example, the training data 191 may not include power data and the communication unit 245 may include hardware operable to measure the signal strength of each mmWave narrow beam that is received by the communication unit 245. The communication unit 245 may transmit signal strength data to the communication module 202 that describes the signal strength of the mmWave narrow beams that are received by the communication unit 245. The signal strength data may include one or more bits that identify which training packet or mmWave narrow beam it is associated with or describes. The communication module 202 may transmit the signal strength data to the power module 204. The power module 204 may analyze the signal strength data and determine, based on the analysis, which of the training packets or mmWave narrow beams has the highest receive power.

In some implementations, the signal strength data may be stored in the memory 227 or the storage 241.

In some implementations, the power module 204 can be stored in the memory 227 of the computer system 200 and can be accessible and executable by the processor 225. The power module 204 may be adapted for cooperation and communication with the processor 225 and other components of the computer system 200 via signal line 224.

The position module 205 can be software including routines for determining the positional information 297 based on which of the training packets, or which mmWave narrow beam, has the highest receive power. For example, the power module 204 transmits a signal to the position module 205 describing which of the training packets has the highest receive power. The position module 205 may analyze the training data 191 to identify the beam ID for the training packet that has the highest receive power. The position module 205 may analyze the map data 195 to identify a spot ID that matches or is associated with the beam ID for the training packet having the highest receive power. The position module 205 may determine the location data associated with the spot ID that matches or is associated with the beam ID for the training packet having the highest receive power. The position module 205 may determine that the location of the vehicle 123 is the location described by the location data associated with the spot ID that matches or is associated with the beam ID for the training packet having the highest receive power. For example, the position module 205 may determine that the positional information 297 matches or substantially matches the location described by the location data.

The position module 205 may be operable to refine or confirm the positional information 297 based on one or more of the velocity data 295, the inertial data 293 and the equation data 291.

In some implementations, the position module 205 can be stored in the memory 227 of the computer system 200 and can be accessible and executable by the processor 225. The position module 205 may be adapted for cooperation and communication with the processor 225 and other components of the computer system 200 via signal line 280.

The GUI module 206 can be software including routines for providing a signal including graphical data to a display or monitor to indicate the location of the vehicle 123. For example, the memory 227 may include graphical data for generating a GUI that describes the location of the vehicle 123. The GUI module 206 may use this graphical data and the positional information 297 to generate a GUI on a head unit of the vehicle 123 that graphically depicts the location of the vehicle 123 as determined by the map data 195 and the training data 191. The GUI module 206 may determine the graphical data. The graphical data may cause a display associated with the client device to provide a GUI that is viewable by a human driver of the vehicle 123. In some implementations, the GUI module 206 can be stored in the memory 227 of the computer system 200 and can be accessible and executable by the processor 225. The GUI module 206 may be adapted for cooperation and communication with the processor 225 and other components of the computer system 200 via signal line 226.

Figure 3:
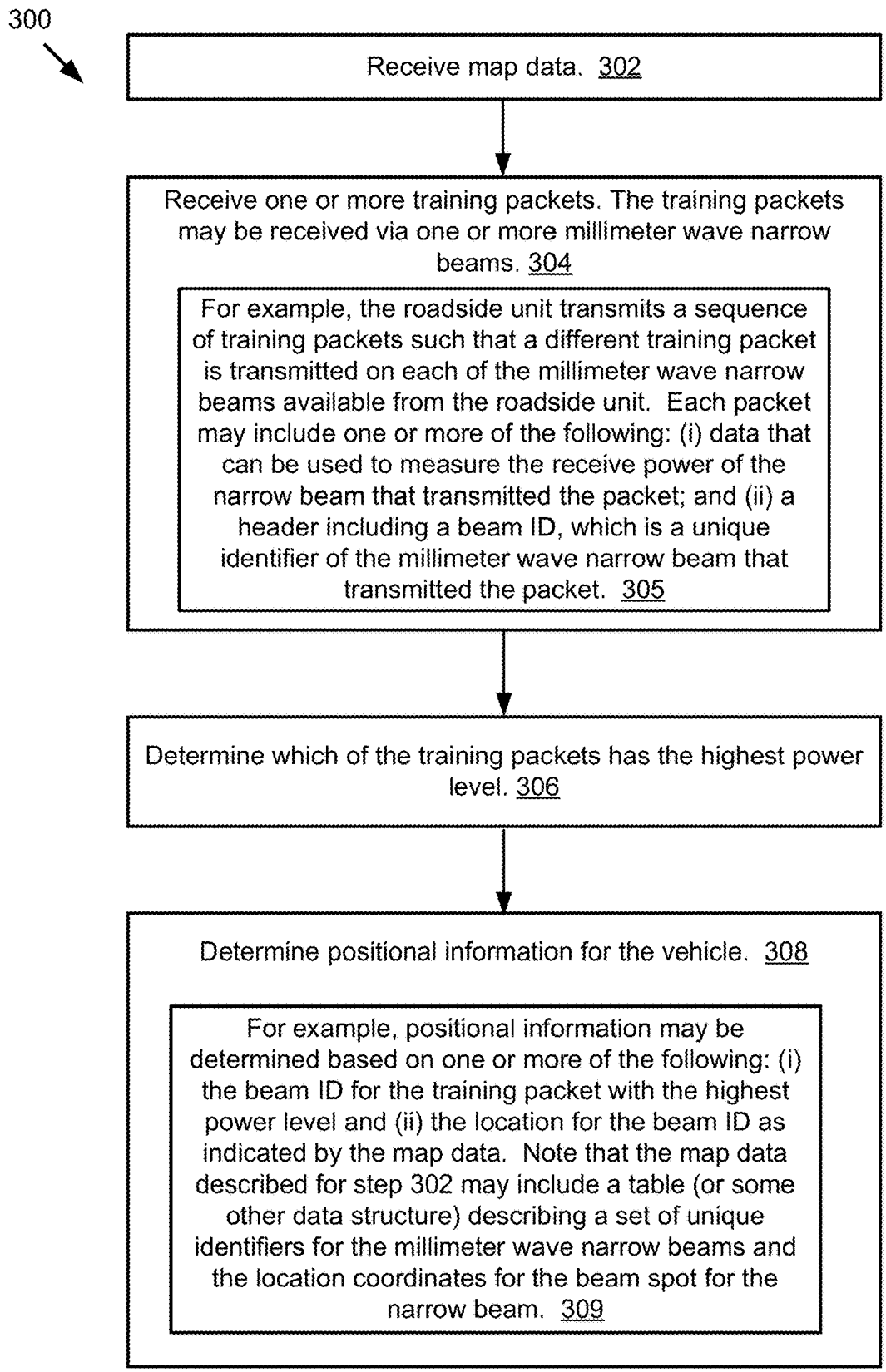
FIG. 3 is a flowchart of an example method for determining a position of a vehicle using a plurality of mmWave narrow beams according to some implementations.

FIG. 3 is a flowchart of an example method 300 for determining a position of a vehicle 123 using a plurality of mmWave narrow beams according to some implementations.

At step 302, the mmWave positioning system 198 may receive the map data 195.

At step 304, the mmWave positioning system 198 may receive one or more training packets. The training packets may be received via one or more mmWave narrow beams.

Element 305 describes an example for step 304. For example, a RSU 199 may transmit a sequence of training packets such that a different training packet is transmitted on each of the mmWave narrow beams available from the RSU 199. Each training packet may include one or more of the following: (1) data that can be used to measure the receive power of the 3 mmWave narrow beam that transmitted the training packet; and (2) a header including a beam ID which is unique for the mmWave narrow beam that transmitted the training packet.

At step 306, the mmWave positioning system 198 may determine which of the training packets has the highest receive power.

At step 308, the mmWave positioning system 198 may determine positional information for the vehicle 123.

Element 309 describes an example for step 308. For example, positional information may be determined based on one or more of the following: (1) the beam ID for the training packet having the highest receive power; and (2) the location for the beam ID as indicated by the map data 195. The map data 195 may include a table or some other data structure that describes a set of unique identifiers for the mmWave narrow beams and the location coordinates for the beam spot for the mmWave narrow beams.

FIG. 4 is a block diagram illustrating a set of equations of operation 400 for determining a position of a vehicle using a plurality of mmWave narrow beams according to some implementations.

FIG. 4 may include one or more of the following parameters: a height of the height of the RSU 199 relative to the roadway surface ($H_T$); a width of a lane of the roadway system ($W_L$); a height of the mmWave receiver of the vehicle 123 relative to the roadway surface ($H_R$); and the distance from the edge of the lane closest to the RSU 199 to the RSU ($d_R$).

FIG. 5 is a block diagram illustrating an example 500 of using the equations of operations 400 for determining a position of a vehicle using a plurality of mmWave narrow beams according to some implementations.

Regarding U.S. patent application Ser. No. 14/471,387 filed on Aug. 28, 2014 and entitled "Full-Duplex Coordination System," in a half-duplex communication system, a first communication device currently transmitting data to a second communication device is not capable of simultaneously receiving data from the second communication device. If the second communication device has data to transmit to the first communication device, the second communication device needs to wait until the first communication device completes its data transmission. Only one communication device is allowed to transmit data at one time in the half-duplex communication system.

In a standard IEEE 802.11 Wireless Local Area Network (WLAN), communication devices may compete for access to a wireless channel based on the Carrier Sense Multiple Access with Collision Avoidance (CSMA/CA) Medium Access Control (MAC) protocol. The IEEE 802.11 MAC protocol requires that only one communication device may use the wireless channel to transmit data at one time. If two or more communication devices transmit data over the wireless channel at the same time, a collision occurs. As a result, only the communication device that currently gains access to the wireless channel may use the wireless channel to transmit data. Other communication devices having data to transmit need to monitor the wireless channel and may compete for access to the wireless channel when the wireless channel becomes idle again.

According to one innovative aspect of the subject matter described in this disclosure, the vehicle 123 (and other communication devices such as the RSU 199) may include a full duplex coordination system for implementing full-duplex wireless communications. The full duplex coordination system may include a processor and a memory storing instructions that, when executed, cause the full duplex coordination system to: create, at a first communication device (such as a vehicle 123, a first RSU 199A or a second RSU 199B), first data (such as any combination of the data stored on the memory 227) to transmit to a second communication device (such as a vehicle 123, a first RSU 199A or a second RSU 199B); switch a half-duplex operation mode of the first communication device to a full-duplex operation mode to activate the full-duplex operation mode of the first communication device; transmit a first portion of the first data from the first communication device to the second communication device using a wireless channel; and transmit, in the full-duplex operation mode of the first communication device, a remaining portion of the first data to the second communication device while simultaneously receiving second data (such as any combination of the data stored on the memory 227) from the second communication device using the wireless channel.

According to another innovative aspect of the subject matter described in this disclosure, a full duplex coordination system for implementing full-duplex wireless communications includes a processor and a memory storing instructions that, when executed, cause the full duplex coordination system to: receive a first portion of first data (such as any combination of the data stored on the memory 227) from a first communication device via a wireless channel; determine that a second communication device is a single destination of the first data based on the first portion of the first data; determine that the second communication device has second data (such as any combination of the data stored on the memory 227) to transmit to the first communication device; determine that the first communication device has full-duplex communication capability; switch a half-duplex operation mode of the second communication device to a full-duplex operation mode to activate the full-duplex operation mode of the second communication device; and transmit, in the full-duplex operation mode of the second communication device, the second data to the first communication device while simultaneously receiving a remaining portion of the first data from the first communication device using the wireless channel.

In general, another innovative aspect of the subject matter described in this disclosure may be embodied in methods that include: creating, at a first communication device, first data to transmit to a second communication device; switching a half-duplex operation mode of the first communication device to a full-duplex operation mode to activate the full-duplex operation mode of the first communication device; transmitting a first portion of the first data from the first communication device to the second communication device using a wireless channel; and transmitting, in the full-duplex operation mode of the first communication device, a remaining portion of the first data to the second communication device while simultaneously receiving second data from the second communication device using the wireless channel.

Yet another innovative aspect of the subject matter described in this disclosure may be embodied in methods that include: receiving a first portion of first data from a first communication device via a wireless channel; determining that a second communication device is a single destination of the first data based on the first portion of the first data; determining that the second communication device has second data to transmit to the first communication device; determining that the first communication device has full-duplex communication capability; switching a half-duplex operation mode of the second communication device to a full-duplex operation mode to activate the full-duplex operation mode of the second communication device; and transmitting, in the full-duplex operation mode of the second communication device, the second data to the first communication device while simultaneously receiving a remaining portion of the first data from the first communication device using the wireless channel.

Another innovative aspect of the subject matter described in this disclosure may be embodied in methods that include: determining first data to transmit from a first communication device to a second communication device; and transmitting, from the first communication device that operates in a full-duplex operation mode, the first data to the second communication device while simultaneously receiving second data from the second communication device using a common wireless channel.

Another innovative aspect of the subject matter described in this disclosure may be embodied in methods that include: receiving, from a first communication device, first data at a second communication device via a wireless channel; determining second data to transmit from the second communication device to the first communication device responsive to receiving at least a portion of the first data; and transmitting, from the second communication device that operates in a full-duplex operation mode, the second data to the first communication device using the wireless channel while simultaneously receiving the first data from the first communication device.

Another innovative aspect of the subject matter described in this disclosure may be embodied in methods that include: determining, at a first communication device, first data to transmit to a second communication device; switching the first communication device from a half-duplex operation mode to a full-duplex operation mode; transmitting, in the full-duplex operation mode of the first communication device, the first data to the second communication device while simultaneously receiving second data from the second communication device using the wireless channel; and switching the full-duplex operation mode of the first communication device to the half-duplex operation mode responsive to a determination that transmission of the first data completes.

Another innovative aspect of the subject matter described in this disclosure may be embodied in methods that include: receiving, from a first communication device, first data at a second communication device via a wireless channel; determining that the second communication device has second data to transmit to the first communication device; switching the second communication device from a half-duplex operation mode to a full-duplex operation mode; transmitting, in the full-duplex operation mode of the second communication device, the second data to the first communication device while simultaneously receiving the first data from the first communication device using the wireless channel; and switching the full-duplex operation mode of the second communication device to the half-duplex operation mode responsive to a determination that transmission of the second data completes.

Other aspects include corresponding methods, systems, apparatus, and computer program products for these and other innovative aspects.

These and other implementations may each optionally include one or more of the following operations and features. For instance, the features include: the first data including a first packet and the first portion of the first data including a header portion of the first packet; the remaining portion of the first data including a payload portion and a trailer portion of the first packet; determining that the second communication device is a single destination of the first data; activating the full-duplex operation mode of the first communication device responsive to the second communication device being the single destination of the first data; the first communication device and the second communication device being communication devices in a wireless local area network; determining that the first communication device operates in a regulated spectrum where full-duplex communication capability is required; receiving device registry data associated with the first communication device; determining that the first communication device has full-duplex communication capability based on the device registry data; and determining that the first communication device has full-duplex communication capability based on a capability indication field in the first portion of the first data, the capability indication field including data describing whether the first communication device has full-duplex communication capability.

For instance, the operations include: determining that the wireless channel is idle; and accessing the wireless channel for data communication between the first communication device and the second communication device based on a channel access rule.

The disclosure is particularly advantageous in a number of respects. For example, the system described herein is capable of achieving a higher throughput and a faster communication speed using full-duplex communication technologies rather than using half-duplex communication technologies. The full-duplex communication may be implemented between one or more vehicles 123, one or more RSUs 199 or other communication devices that have full-duplex communication capability. In another example, the system coordinates communication between communication devices in a distributed way without using a central coordinator. The system determines a pair of communication devices and coordinates simultaneous transmission of data between the pair of communication devices so that the pair of communication devices may transmit data to each other simultaneously using the same wireless channel. Meanwhile, other communication devices may not transmit data over the wireless channel to avoid collision. The advantages of the system described herein are provided by way of example, and the system may have numerous other advantages.

The disclosure includes a system and method for implementing full-duplex wireless communications between communication devices. A full-duplex coordination system may include a processor and a memory storing instructions that, when executed, cause the full-duplex coordination system to: create, at a first communication device, first data to transmit to a second communication device; switch a half-duplex operation mode of the first communication device to a full-duplex operation mode to activate the full-duplex operation mode of the first communication device; transmit a first portion of the first data from the first communication device to the second communication device using a wireless channel; and transmit, in the full-duplex operation mode of the first communication device, a remaining portion of the first data to the second communication device while simultaneously receiving second data from the second communication device using the wireless channel.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present implementations can be described above primarily with reference to user interfaces and particular hardware. However, the present implementations can apply to any type of computing device that can receive data and commands, and any peripheral devices providing services.

Reference in the specification to "some implementations" or "some instances" means that a particular feature, structure, or characteristic described in connection with the implementations or instances can be included in at least one implementation of the description. The appearances of the phrase "in some implementations" in various places in the specification are not necessarily all referring to the same implementations.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present implementations of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations or some implementations containing both hardware and software elements. In some preferred implementations, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method implemented by a vehicle, the method comprising:
   receiving by the vehicle, via a wireless message transmitted by a roadside unit, map data for a geographic region;
   receiving, via a plurality of millimeter wave narrow beams transmitted by the roadside unit via millimeter wave communication, a set of training packets;
   analyzing the set of training packets to identify a training packet included in the set of training packets that has a highest receive power level among the set of training packets; and
   determining positional information for the vehicle based on the training packet included in the set of training packets that has the highest receive power level and the map data.

2. The method of claim 1, wherein:
   each of the plurality of millimeter wave narrow beams includes only one training packet;
   each of the plurality of millimeter wave narrow beams is directed at a roadway traveled by the vehicle to form a different beam spot on the roadway so that the plurality of millimeter wave narrow beams forms a plurality of beam spots on the roadway; and
   each of the plurality of beam spots includes an area of the roadway that is not covered by other beam spots in the plurality of beam spots so that each beam spot corresponds to a different location on the roadway.

3. The method of claim 2, wherein the vehicle includes a non-transitory memory that stores map data that describes, for each of the millimeter wave narrow beams included in the plurality of millimeter wave narrow beams, a spot identifier (ID) that uniquely identifies a beam spot formed by a millimeter wave narrow beam and location data describing a location of the beam spot formed by the millimeter wave narrow beam on the roadway.

4. The method of claim 2, wherein each training packet includes power data describing a receive power level for the training packet and a beam identifier (ID) which uniquely identifies a millimeter wave narrow beam that transmitted the training packet.

5. The method of claim 3, wherein:
each training packet includes power data describing a receive power level for the training packet and a beam ID which uniquely identifies the millimeter wave narrow beam that transmitted the training packet; and
analyzing the set of training packets to identify the training packet included in the set that has the highest receive power level includes analyzing the power data for each training packet to identify the beam ID associated with the training packet having the highest receive power level.

6. The method of claim 3, wherein
each training packet includes power data describing a receive power level for the training packet and a beam ID which uniquely identifies the millimeter wave narrow beam that transmitted the training packet;
analyzing the set of training packets to identify the training packet included in the set that has the highest receive power level includes analyzing the power data for each training packet to identify the beam ID associated with the training packet having the highest receive power level; and
determining the positional information for the vehicle includes analyzing the map data to identify the spot ID described by the map data that matches the beam ID associated with the training packet having the highest receive power level and determining the positional information for the vehicle to be the location described by the location data associated with the spot ID.

7. The method of claim 1, wherein a location of the vehicle described by the positional information is accurate to within one meter or less of an actual position of the vehicle.

8. A system comprising:
a vehicle including a communication unit and a non-transitory memory that are each communicatively coupled to a millimeter wave positioning system and a processor;
wherein the communication unit receives, via a wireless message transmitted by a roadside unit, map data for a geographic region;
wherein the communication unit receives, via a plurality of millimeter wave narrow beams transmitted by the roadside unit via millimeter wave communication, a set of training packets; and
wherein the millimeter wave positioning system includes instructions that, responsive to being executed by the processor, cause the processor to:
analyze the set of training packets to identify a training packet included in the set of training packets that has a highest receive power level among the set of training packets; and
determine positional information for the vehicle based on the training packet included in the set of training packets that has the highest receive power level and the map data.

9. The system of claim 8, wherein
each of the plurality of millimeter wave narrow beams includes only one training packet;
each of the plurality of millimeter wave narrow beams is directed at a roadway traveled by the vehicle to form a different beam spot on the roadway so that the plurality of millimeter wave narrow beams forms a plurality of beam spots on the roadway; and
each of the plurality of beam spots includes an area of the roadway that is not covered by other beam spots in the plurality of beam spots so that each beam spot corresponds to a different location on the roadway.

10. The system of claim 9, wherein the vehicle includes a non-transitory memory that stores map data that describes, for each of the millimeter wave narrow beams included in the plurality of millimeter wave narrow beams, a spot identifier (ID) that uniquely identifies a beam spot formed by a millimeter wave narrow beam and location data describing a location of the beam spot formed by the millimeter wave narrow beam on the roadway.

11. The system of claim 9, wherein each training packet includes power data describing a receive power level for the training packet and a beam identifier (ID) which uniquely identifies a millimeter wave narrow beam that transmitted the training packet.

12. The system of claim 10, wherein:
each training packet includes power data describing a receive power level for the training packet and a beam ID which uniquely identifies the millimeter wave narrow beam that transmitted the training packet; and
analyzing the set of training packets to identify the training packet included in the set that has the highest receive power level includes analyzing the power data for each training packet to identify the beam ID associated with the training packet having the highest receive power level.

13. The system of claim 10, wherein
each training packet includes power data describing a receive power level for the training packet and a beam ID which uniquely identifies the millimeter wave narrow beam that transmitted the training packet;
analyzing the set of training packets to identify the training packet included in the set that has the highest receive power level includes analyzing the power data for each training packet to identify the beam ID associated with the training packet having the highest receive power level; and
determining the positional information for the vehicle includes analyzing the map data to identify the spot ID described by the map data that matches the beam ID associated with the training packet having the highest receive power level and determining the positional information for the vehicle to be the location described by the location data associated with the spot ID.

14. The system of claim 8, wherein a location of the vehicle described by the positional information is accurate to within one meter or less of an actual position of the vehicle.

15. A computer program product comprising a non-transitory computer-usable medium including a computer-readable program, wherein the computer-readable program when executed on a computer of a vehicle causes the computer to:
receive by the vehicle, via a wireless message transmitted by a roadside unit, map data for a geographic region;
receive, via a plurality of millimeter wave narrow beams transmitted by the roadside unit via millimeter wave communication, a set of training packets;
analyze the set of training packets to identify a training packet included in the set of training packets that has a highest receive power level among the set of training packets; and determine positional information for the vehicle based on the training packet included in the set of training packets that has the highest receive power level and the map data.

16. The computer program product of claim 15, wherein:
each of the plurality of millimeter wave narrow beams includes only one training packet;
each of the plurality of millimeter wave narrow beams is directed at a roadway traveled by the vehicle to form a different beam spot on the roadway so that the plurality of millimeter wave narrow beams forms a plurality of beam spots on the roadway; and
each of the plurality of beam spots includes an area of the roadway that is not covered by other beam spots in the plurality of beam spots so that each beam spot corresponds to a different location on the roadway.

17. The computer program product of claim 16, wherein the vehicle includes a non-transitory memory that stores map data that describes, for each of the millimeter wave narrow beams included in the plurality of millimeter wave narrow beams, a spot identifier (ID) that uniquely identifies a beam spot formed by a millimeter wave narrow beam and location data describing a location of the beam spot formed by the millimeter wave narrow beam on the roadway.

18. The computer program product of claim 16, wherein each training packet includes power data describing a receive power level for the training packet and a beam identifier (ID) which uniquely identifies a millimeter wave narrow beam that transmitted the training packet.

19. The computer program product of claim 17, wherein:
each training packet includes power data describing a receive power level for the training packet and a beam ID which uniquely identifies the millimeter wave narrow beam that transmitted the training packet; and
analyzing the set of training packets to identify the training packet included in the set that has the highest receive power level includes analyzing the power data for each training packet to identify the beam ID associated with the training packet having the highest receive power level.

20. The computer program product of claim 17, wherein:
each training packet includes power data describing a receive power level for the training packet and a beam ID which uniquely identifies the millimeter wave narrow beam that transmitted the training packet;
analyzing the set of training packets to identify the training packet included in the set that has the highest receive power level includes analyzing the power data for each training packet to identify the beam ID associated with the training packet having the highest receive power level; and
determining the positional information for the vehicle includes analyzing the map data to identify the spot ID described by the map data that matches the beam ID associated with the training packet having the highest receive power level and determining the positional information for the vehicle to be the location described by the location data associated with the spot ID.

* * * * *